United States Patent
Domange

(10) Patent No.: US 7,264,095 B2
(45) Date of Patent: Sep. 4, 2007

(54) VIBRATION AND DISPLACEMENT DAMPER, IN PARTICULAR FOR CABLE STAYS

(75) Inventor: Bruno Domange, Paris (FR)

(73) Assignee: Enidine GmbH, Bellingen-Rheinweiler (DE)

( * ) Notice: Subject to any disclaimer, the term of this patent is extended or adjusted under 35 U.S.C. 154(b) by 0 days.

(21) Appl. No.: 10/827,378

(22) Filed: Apr. 20, 2004

(65) Prior Publication Data

US 2004/0222058 A1   Nov. 11, 2004

(30) Foreign Application Priority Data

Apr. 22, 2003   (FR)   .................................. 03 04929

(51) Int. Cl.
*F16F 9/49*   (2006.01)
(52) U.S. Cl. ...................... 188/280; 188/312; 188/315
(58) Field of Classification Search ................ 188/280, 188/269, 314–315, 316–318, 297, 312, 378; 267/64.15; 52/167.1; 16/51–52; 14/22; 248/636, 631
See application file for complete search history.

(56) References Cited

U.S. PATENT DOCUMENTS 3,970,292 A * 7/1976 Dachicourt et al. ...... 267/64.28
4,280,600 A    7/1981 Salmon et al.
4,768,627 A * 9/1988 Taylor ........................ 188/280

FOREIGN PATENT DOCUMENTS

| BE | 458 209 A | 3/1945 |
|----|-----------|--------|
| DE | 923 592 C | 2/1955 |
| DE | 26 23 622 | 12/1977 |
| JP | 09 059921 | 3/1997 |

* cited by examiner

*Primary Examiner*—Robert A. Siconolfi
*Assistant Examiner*—Bradley T. King
(74) *Attorney, Agent, or Firm*—Young & Thompson

(57) ABSTRACT

A vibration and displacement damper includes a plunger piston (10) sliding with a slight clearance inside a guiding cylinder (20). The plunger piston includes over a part of its length a piston ring (12) sliding inside a main chamber (13) provided in the cylinder, the ring including calibrated through-orifices (14) for a high-viscosity fluid filling the chamber on both sides of the ring. The device is intended to damp vibrations and displacements, in particular of cable stays.

14 Claims, 3 Drawing Sheets

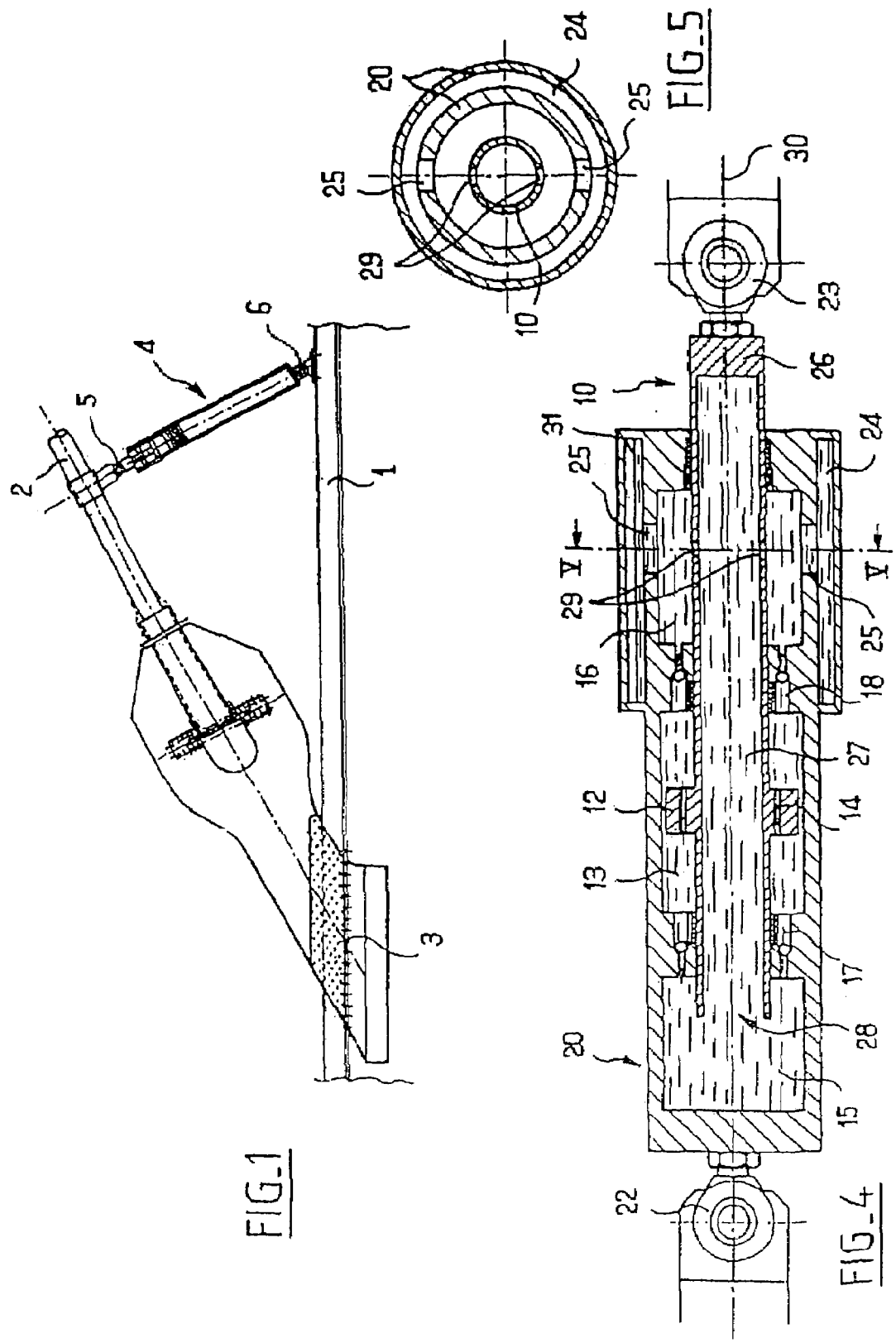

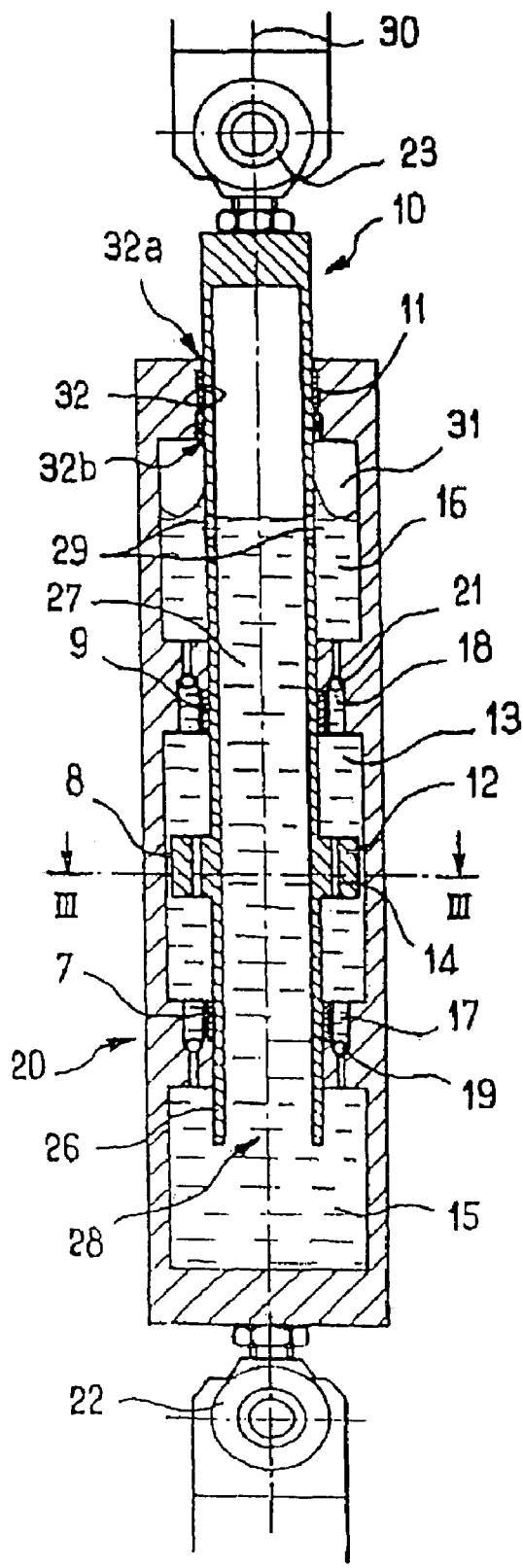
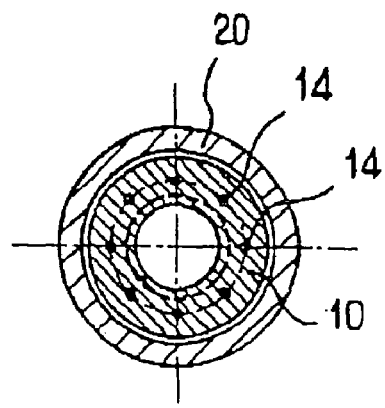
FIG_2
FIG_3

VIBRATION AND DISPLACEMENT DAMPER, IN PARTICULAR FOR CABLE STAYS

BACKGROUND OF THE INVENTION

The present invention basically relates to a vibration and displacement damper, more particularly one that is intended and is suitable for damping the vibrations of cable stays, for works such as suspension bridges, and for damping structures and buildings that are liable to become displaced and to develop resonant vibratory phenomena.

In order to damp vibrations and displacements, of this type, which are slight but highly repetitive, it is essential that the damper is able to withstand the forces to which it is subjected for very long periods of time, without receiving any maintenance, whilst at the same time displaying minimal variations in operation over the wide range of temperatures in which it is required to operate.

DESCRIPTION OF THE RELATED ART

U.S. Pat. No. 4,280,600 discloses a vibration damper in which the communication between a main chamber and secondary chambers is not controlled.

BE-458 209 discloses a vibration damper in which a main damping chamber is disposed in a loop, fluid being displaced by a blockage in the loop, which is equipped with a plurality of valves, the opening direction of which may vary, in which the damper frame is not cylindrical and the oil used is necessarily or low viscosity.

DE-2 623 622 discloses a vibration damper, which is incorporated into a suspended device intended for measuring the torque on industrial machines, which is not required to undergo significant variations in temperature, as is the case with cable stay dampers, and which uses a low-viscosity oil that varies considerably according to temperature.

DE-923 592 discloses a damper intended for vehicles and in which one of the secondary chambers is not inserted into a cylinder and the oil is necessarily of low viscosity.

JP-09 059 921 discloses the application of dampers for sustaining bridge cables.

SUMMARY OF THE INVENTION

The invention relates to a damper that comprises a plunger piston sliding on the inside of a guiding cylinder in a longitudinal direction, the plunger piston comprises over a part of its length a piston ring sliding with a slight clearance inside a main chamber provided in said cylinder, said ring comprises calibrated through-orifices for a high-viscosity fluid filling said chamber on both sides of said ring, said cylinder comprises, on either side of said main chamber in the longitudinal direction, two secondary chambers that the plunger piston enters, said secondary chambers are filled, at least in part, by said high-viscosity fluid and isolated, relative to the main chamber, from the entry of the high-viscosity fluid. A highly reliable and long-lasting damper may be obtained with a construction of this type, which does not require any form of seal.

Advantageously, the damper further comprises means for maintaining the two secondary chambers at substantially the same pressure. The fluid is thus prevented from becoming compressed in one of the chambers, such that the resistance to the, displacement of the piston relative to the cylinder is basically due to the shearing of the high-viscosity fluid in the main chamber, owing to the displacement of the ring.

In order to do this, according to a further advantageous, characteristic of the invention, one of the secondary chambers contains an air volume and is connected to the other secondary chamber, such that the high-viscosity fluid may circulate freely between these two secondary chambers. The air volume allows variations in the volume occupied by the fluid to be absorbed, without generating significant variations in pressure in the secondary chambers, whilst at the same time insulating the main chamber and the secondary chambers from the environment, the air being highly compressible.

Advantageously, in order to connect the two secondary chambers and to maintain them at substantially the same pressure, the damper comprises a duct, provided in the piston and opening into each of the secondary chambers. The fluid communication between the two secondary chambers is thus produced in a simple manner, and the piston is both light and very strong.

According to a further characteristic of the invention, the damper further comprises at least one through-path provided in the cylinder, in which means for limiting the passage of fluid from said main chamber toward the secondary chambers are inserted. In this way, it is ensured that the required quantity of damping fluid is maintained in the main chamber.

BRIEF DESCRIPTION OF THE DRAWINGS

The invention will be clarified by the following description, which refers to the accompanying drawings, in which:

FIG. 1 shows an application of a damping device for a cable stay used, for example, to support the deck of a bridge;

FIG. 2 is a longitudinal section of a damper constructed according to the invention;

FIG. 3 is a cross-section taken along the line III-III of FIG. 2;

FIG. 4 is a longitudinal section of a further damper constructed according to the invention;

FIG. 5 is a cross-section taken along the line V-V of FIG. 4; and

DESCRIPTION OF THE PREFERRED EMBODIMENTS

Figure 6:
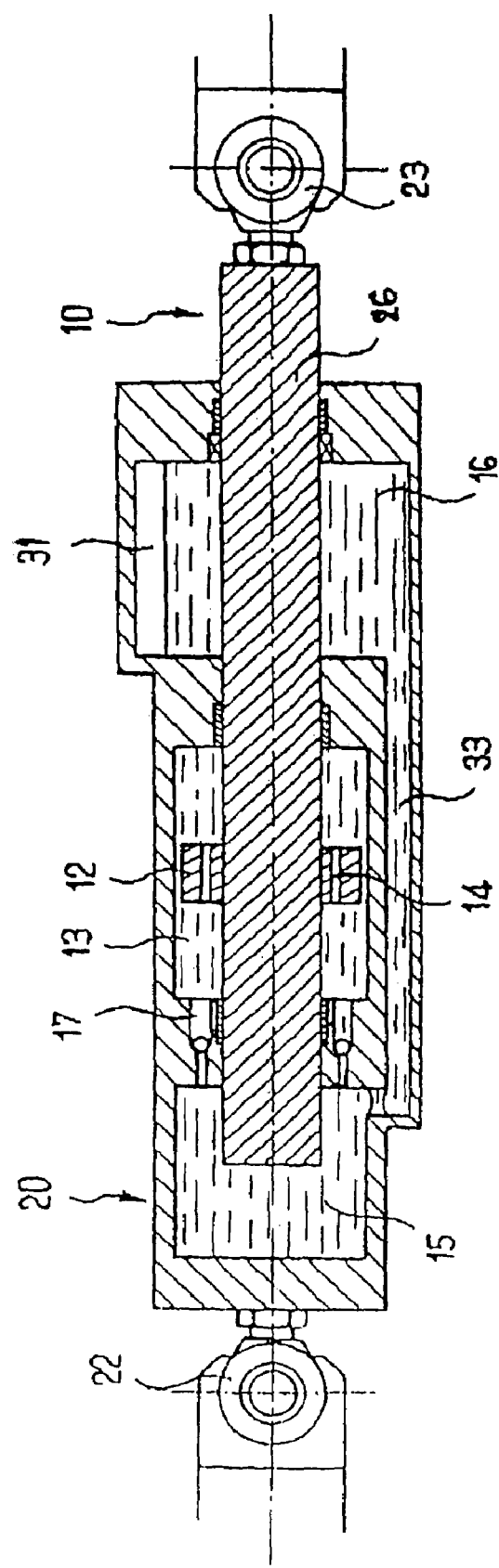
FIG. 6 is a longitudinal section of yet a further damper constructed according to the invention.

FIG. 1 shows schematically part of the deck 1 of a bridge supported by a cable stay 2, anchored to the deck at 3. In order to damp the transverse vibrations to which the cable 2 is subjected as a result, for example, of wind and vehicles using the bridge, a damper, generally comprising an oleopneumatic cylinder, which is anchored at one of its ends, at 5, to the cable 2 and at its other end, at 6, to the deck 1, has been provided at 4. The stresses to which cylinders of this type are subjected are not generally very great, for example around 5 to 15 kN (kilonewtons), but the number of cycles is very high (between hundreds of thousands and several million per year of use), such that these devices require careful maintenance, in particular in respect of the seals and possible leakages. Furthermore, the characteristics of these devices vary considerably according to the temperature conditions to which they are subjected, such that in practice they have to be over-designed considerably in order to meet the requisite criteria in the least favourable conditions of use.

Reference will now be made to FIGS. 1 and 2, which show a damper constructed according to the invention.

The damper basically comprises a hollow plunger piston, designated in its entirety by the reference numeral 10, and a guide cylinder, designated in its entirety by the reference numeral 20, in which the plunger piston slides with a slight clearance in a substantially vertical longitudinal direction 30. The guiding and sliding surfaces are located, in the embodiment shown, in the region of the cooperating surfaces, designated in FIG. 2 by the reference numerals 7, 8, 9 and 11. In order to assist sliding, the plunger piston 10 may, for example, be made from (surface-treated) chrome-plated steel, while the cylinder 20 may be produced with bronze guide bearings 7, 9 and 11. Over an intermediate part of its length, the plunger piston 10 comprises a ring 12 (in the form of a thick disc), which slides with a slight clearance (in the region of the surface 8) inside a main chamber 13 provided in the cylinder 20 and completely filled with a high-viscosity damping fluid. The ring 12 of the piston comprises a specific number of calibrated orifices 14 (eight in the example shown, as may be seen from FIG. 3), which allow the high-viscosity fluid to move from one side to the other of the ring 12 inside the chamber 13, thus performing the damping function of the device. It will be noted that, owing to the slight clearance in the region of the surface 8, the passage of fluid along this surface will generally be much less than the rate of passage through the calibrated orifices 14.

In order to ensure long-term functioning of the damper, two secondary chambers, 15 and 16 respectively, which, in the embodiment shown, both communicate with the main chamber 13 via through-paths 17, 18, to which non-return valves 19, 21 are fitted, are provided either side of the main chamber 13. Jets or other similar means may be provided instead of the non-return valves 19, 21. These means are intended to limit the leakage of fluid from the chamber 13 toward the chambers 15 and 16, and to facilitate it from said secondary chambers toward the main chamber.

The piston 10 comprises a rod 26 having, in the longitudinal direction 30, a fixing end 23 and a free end 28, disposed inside the secondary chamber 15. Said rod 26 is hollow over most of its length. It thus defines an internal conduit 27, opening at the free end 28 into the secondary chamber 15. The internal conduit communicates, near the fixing end 23 with the secondary chamber 16, via orifices 29.

The internal conduit 27 thus places the secondary chambers 15 and 16 in, fluid communication, such that they are at substantially the same pressure.

Furthermore, the secondary chamber 15 is completely filled with damping fluid, in contrast to the secondary chamber 16, which contains an air volume 31 in its upper part. A bore 32, delimited in particular by the guide bearing 11, provided in the cylinder 20 and crossed by the rod 26, has a first end 32a that is open to the exterior and a second end 32b opening into said air volume 31, in which it is entirely enclosed.

Thus, even if the seal between the rod 26 and the bore 32 is not perfect, or if indeed there is no seal, there is no leakage of damping fluid. As shown, the bore 32 is the only opening made in the cylinder 20, extending between the inside of the cylinder and the surrounding environment.

The device is, of course, completed by fixings at the two ends, one 22 provided on the cylinder 20 and the other 23 on the piston 10 respectively, in order to install the damper on the structure to be damped.

The embodiment shown in FIGS. 4 and 5 differs from the embodiment shown in FIGS. 2 and 3 only in that, as the damping device is intended to be fitted substantially horizontally, and not substantially vertically, as is the case with the embodiment of FIGS. 2 and 3, a complementary chamber 24, which communicates with one of the secondary chambers 16 via at least two holes 25, has also been provided. The construction is otherwise the same and will not be described any further, identical parts also being designated by identical reference numerals in FIG. 2 and 4.

The embodiment shown in FIG. 6 shows three independent modifications that may be made to the embodiment shown in FIGS. 4 and 5, even though these modifications are not recommended.

The rod 26 of the piston 10 is solid, the damping fluid circulates between the secondary chambers 15 and 16 via an ancillary conduit 33.

The damper is provided with non-return valves 19 only between one 15 of the secondary chambers and the main chamber 13.

The secondary chamber 16 does not have a complementary chamber 24 and contains the air volume 31. The important thing is that the air volume 31 is sufficiently large to absorb the differences in volume of damping fluid, but not too large, relative to the volume of the secondary chamber 16, to prevent air from entering the main chamber 13.

Tests have shown that dampers of this type operate in a highly satisfactory manner with viscous or very viscous fluids, the. viscosity having to be greater than or equal to 500 cSt and being able to go up to several million centistokes. For viscosities of this type, the variations in ambient temperature have little effect on damping efficiency, and virtually no fluid is lost over time. More precisely, even if the viscosity varies with temperature, it is still sufficiently high at the most elevated temperatures for the damping variations to be slight.

The absorbed stresses may range from 1 to 1000 kN and will generally be around 5 to 15 kN for a movement varying from 0 to ±100 mm. The dimensions of the damper remain relatively small; according to one embodiment, the damper had a length of approximately 30 cm with an external diameter of approximately 7 cm.

The invention claimed is:

1. Vibration and displacement damper, comprising:
a plunger piston (10) sliding inside a guiding cylinder (20) in a longitudinal direction (30),
the plunger piston comprising, over a part of a length of said plunger piston, a piston ring (12) sliding with a slight clearance inside a main chamber (13) provided in said cylinder,
said piston ring comprising calibrated through-orifices (14) for a high-viscosity fluid, such that the variations in ambient temperature have little effect on damping efficiency, the fluid filling said chamber on both sides of said piston ring,
said cylinder comprising, on either side of said main chamber (13) in the longitudinal direction, two secondary chambers (15, 16) that the plunger piston enters,
said secondary chambers being filled, at least in part, by said high-viscosity fluid and comprising limiting means (19, 21) for limiting the passage or leakage of fluid from the main chamber toward the secondary chambers, and for facilitating the leakage of fluid from at least one of the secondary chambers toward the main chamber,
wherein said fluid has a viscosity greater than 500cSt,
wherein the damper comprises a conduit (27) provided in the piston and opening (28, 29) into each of the secondary chambers (15, 16),
wherein the damper further comprises at least one through-path (17, 18) provided in the cylinder in which is inserted said limiting means (19, 21) for limiting the passage or leakage of fluid from said main chamber toward the secondary chambers, and wherein one of the secondary chambers (16) communicates with a complementary chamber (24) via at least two holes (25), which complementary chamber (24) contains an air volume (31), and wherein said one secondary chamber (16) is connected (27; 28; 29; 33) to the other secondary chamber (15) such that the high viscosity fluid circulates freely between the two secondary chambers (15, 16).

2. Damper according to claim 1, wherein said plunger piston (10) is made from chromium-plated steel, treated in order to harden it at the surface, and is guided into said cylinder (20) on bronze bearings.

3. Assembly comprising a damper according to claim 1, a vibration-damping cable and a structure to which the cable is attached, wherein the plunger piston and the cylinder are respectively connected, on the one hand, to the cable and, on the other hand, to the structure to which the cable is attached.

4. Damper according to claim 1, wherein said plunger piston (10) is made from chromium-plated steel, treated in order to harden it at the surface, and is guided into said cylinder (20) on bronze bearings.

5. A damper according to claim 1, wherein, said limiting means (19, 21) for limiting the passage or leakage of fluid from said main chamber to said secondary chambers are non-return valves.

6. A damper according to claim 1, wherein, said damper absorbs stresses in a range from 1 kN to 1000 kN.

7. A damper according to claim 1, wherein the conduit (27) opens at the free end (28) of the rod (26) into the other secondary chamber (15).

8. A damper according to claim 1, wherein said damper is configured to be fitted substantially horizontally.

9. A damper according to claim 1, wherein the air volume (31) is in contact with the high viscosity fluid in the complementary chamber (24).

10. A damper according to claim 1, wherein,
the complementary chamber (24) has a longest longitudinal dimension in the longitudinal direction,
in use, the air volume (31) has a longest longitudinal dimension in the longitudinal direction, and
the air volume (31) occupies an upper part of the complementary chamber (24).

11. A vibration and displacement damper, comprising:
a guiding cylinder (20) with a length defining a longitudinal direction (30) and having a first end and a second end;
a main chamber (13) within the guiding cylinder;
a first secondary chamber (15) within the guiding cylinder and located towards the first end of the guiding cylinder;
a second secondary chamber (16) within the guiding cylinder and located towards the second end of the guiding cylinder, the main chamber being located intermediate the first and second secondary chambers;
a plunger piston (10) sliding, in the longitudinal direction (30), inside the guiding cylinder (20) including inside the main and secondary chambers (13, 15, 16);
a fluid with a viscosity of at least 500 cSt, the fluid filling, at least in part, an inside of the secondary chambers and in fluid communication between the guiding cylinder and inside the guiding cylinder (20) and the main and secondary chambers (13, 15, 16);
a piston ring (12) located over a part of a length of the plunger piston (10), the piston ring (12) sliding inside the main chamber (13);
through-orifices (14) located within the piston ring and allowing the fluid to move from one side of the piston ring to another side of the piston ring, the fluid filling the main chamber on both sides of the piston ring;
through-paths (17, 18) connecting each of the secondary chambers to the main chamber;
limiting elements (19, 21) inserted in the through-paths and limiting passage of the fluid from the main chamber toward the secondary chambers and facilitating leakage of the fluid from at least one of the secondary chambers towards the main chamber;
a conduit (27) provided in the piston and opening (28, 29) into both the first and second secondary chambers (15, 16);
a complementary chamber (24) extending along the longitudinal direction (30) and located exterior to the second secondary chamber (16); and
at least two holes (25) connecting the second secondary chamber to the complementary chamber, the complementary chamber (24) containing an air volume (31), the second chambers (15, 16) being connected such that the fluid circulates freely between the two secondary chambers (15, 16).

12. A damper according to claim 11, wherein said damper is configured to be fitted substantially horizontally.

13. A damper according to claim 11, wherein the air volume (31) is in contact with the fluid in the complementary chamber (24).

14. A damper according to claim 11, wherein,
the complementary chamber (24) has a longest longitudinal dimension in the longitudinal direction,
in use, the air volume (31) has a longest longitudinal dimension in the longitudinal direction, and
the air volume (31) occupies an upper part of the complementary chamber (24).

* * * * *